(12) United States Patent
Imagawa et al.

(10) Patent No.: US 9,073,078 B2
(45) Date of Patent: Jul. 7, 2015

(54) MEMBER JOINT AND SPRAY NOZZLE UNIT USING THE SAME

(75) Inventors: Yoshinari Imagawa, Minabe (JP); Naruki Yukura, Mihama (JP)

(73) Assignee: Yamaho Industry Co., Ltd., Wakayama (JP)

(*) Notice: Subject to any disclaimer, the term of this patent is extended or adjusted under 35 U.S.C. 154(b) by 659 days.

(21) Appl. No.: 13/393,258

(22) PCT Filed: Apr. 22, 2011

(86) PCT No.: PCT/JP2011/059951
§ 371 (c)(1),
(2), (4) Date: Mar. 26, 2012

(87) PCT Pub. No.: WO2012/144072
PCT Pub. Date: Oct. 26, 2012

(65) Prior Publication Data
US 2012/0267456 A1    Oct. 25, 2012

(51) Int. Cl.
*F16J 15/00* (2006.01)
*B05B 15/06* (2006.01)
(Continued)

(52) U.S. Cl.
CPC ............... *B05B 15/065* (2013.01); *B05B 1/14* (2013.01); *B05B 15/066* (2013.01); *F16L 19/005* (2013.01); *F16L 27/093* (2013.01)

(58) Field of Classification Search
CPC .... F16L 19/005; F16L 37/252; B05B 15/065; B05B 15/066
USPC ............. 239/600, 588, 587.5; 285/89, 92, 86; 215/330
See application file for complete search history.

(56) References Cited

U.S. PATENT DOCUMENTS 5,498,043 A * 3/1996 Goldenberg .................. 285/242

5,685,445 A   11/1997 Dobbs
(Continued)

FOREIGN PATENT DOCUMENTS

JP    62-24091    2/1987
JP    63-180790   7/1988
(Continued)

OTHER PUBLICATIONS

International Search Report issued Jul. 5, 2011 in International (PCT) Application No. PCT/JP2011/059951.

*Primary Examiner* — Dinh Q Nguyen
(74) *Attorney, Agent, or Firm* — Wenderoth, Lind & Ponack, L.L.P.

(57) ABSTRACT

A member joint, in which a great rotating force is inevitably transmitted to a union nut connecting two members at the time of relatively rotating both the members, is structured such as to reliably carry out corotation prevention of the union nut, without complicating fixation of the nut and releasing of the fixation and without causing enlargement in size and deterioration of durability of a connecting portion. In a member joint (10) connecting a first member (1) and a second member (2) by pinching a flange (6) provided in the second member (2) with respect to the first member (1) by a union nut (3), an outer periphery of the first member (1) is provided with a projection (7) having a leading surface (7a) and a trailing surface (7b), a lock ring (4) is rotatably attached to an open leading end portion of the union nut (3), an inner periphery of the lock ring (4) is provided with a lock pawl (9) which can pass over the projection (7) by being elastically deformed, the union nut (3) is provided with a pinching piece (8) which is engaged with the lock pawl (9), and a leading end side of the lock pawl (9) is pinched between the pinching piece (8) and the trailing surface (7b) when the union nut (3) screwed into a screwing end point rotates by itself in a loosening direction, whereby loosening of the union nut (3) is prevented.

15 Claims, 6 Drawing Sheets

(51) Int. Cl.
*F16L 19/00* (2006.01)
*B05B 1/14* (2006.01)
*F16L 27/093* (2006.01)

(56) References Cited

U.S. PATENT DOCUMENTS 5,746,454 A * 5/1998 Webb .............................. 285/92
6,511,001 B1 * 1/2003 Huang ........................... 239/526

FOREIGN PATENT DOCUMENTS

| | | |
|---|---|---|
| JP | 2-147250 | 12/1990 |
| JP | 06-201081 | 7/1994 |
| JP | 9-002502 | 1/1997 |
| JP | 10-110870 | 4/1998 |
| JP | 2000-140710 | 5/2000 |
| JP | 2009-085287 | 4/2009 |

* cited by examiner

MEMBER JOINT AND SPRAY NOZZLE UNIT USING THE SAME

TECHNICAL FIELD

The present invention relates to a member joint which connects two members so as to allow relative rotation, and a spray nozzle unit which connects a nozzle head and a nozzle holder so as to be relatively rotatable by using the member joint. The member joint according to the present invention refers to both a pipe joint and a shaft joint, both of which use a union nut.

BACKGROUND ART

As a conventional example of the pipe joint, there are pipe joints which are shown in Patent Documents 1 and 2 listed below. The pipe joint of Patent Document 1 is structured such that a sleeve is pressed against an outer periphery of a pipe in a front side, and the pipe in the front side is connected to a pipe in a rear side by withholding it by a cover body which is screwed onto a main body (corresponding to a union nut). Further, loosening of the cover body is prevented by fixing the cover body to the main body by a connecting pin.

On the other hand, the pipe joint of Patent Document 2 is structured such that an adjusting joint is rotatably attached to an outer periphery of a leading end via a ball, and a nozzle tip is attached to a leading end of the adjusting joint by using a union nut (a cap nut). Because of such a structure, the union nut does not become loose even if the pipe joint and the adjusting joint are relatively rotated.

Further, a loosening preventing structure of a container plug which can be utilized as a countermeasure for loosening of the union nut is disclosed in Patent Document 3 listed below. In this structure, an outer periphery of a container neck and an inner periphery of a container cap are provided with ratchet gear teeth which mesh with each other, and when the cap is rotated in a closing direction, the gear teeth in the cap side moves on a leading surface of the gear teeth in the neck side so as to pass over the gear teeth in the neck side, whereas when the cap is rotated in a loosening direction, the gear teeth in the cap side moves on the trailing surface of the gear teeth in the neck side so as to pass over the gear teeth in the neck side.

PRIOR ART DOCUMENTS

Patent Documents

Patent Document 1: Japanese Unexamined Patent Publication No. 10-110870
Patent Document 2: Japanese Unexamined Patent Publication No. 2000-140710
Patent Document 3: Japanese Unexamined Patent Publication No. H9-2502

SUMMARY OF THE INVENTION

Problems to be Solved by the Invention

Figure 7:
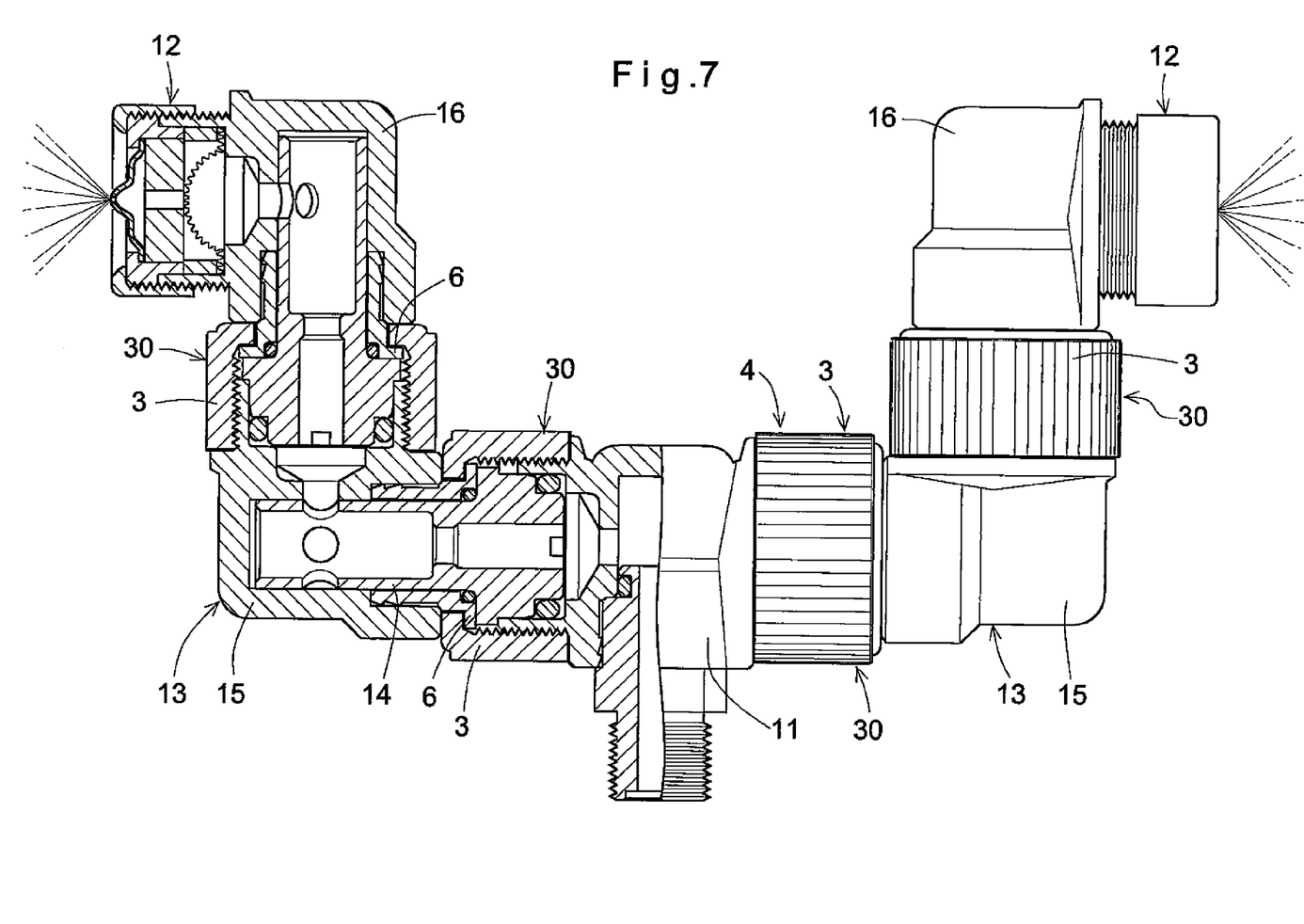
FIG. 7 is a partial breakaway front view showing a spray nozzle unit before being improved.

As one of spray nozzle units which is under development by the present applicant, for example, there is a spray nozzle unit which is shown in FIG. 7, and a necessity has arisen for preventing loosening of a union nut in this product.

A spray nozzle unit in FIG. 7 includes a nozzle holder 11 which is connected to a supply pipe of a spray liquid, and a nozzle head 13 which is retained to the nozzle holder 11.

The nozzle head 13 includes a total of four sets of pipe joints 30, i.e., two sets in one side, each set having a union nut 3. The union nut 3 of one pipe joint 30 in one side is rotatably installed to an outer periphery in one end side of a first elbow 15 so as to be screwed onto a nozzle holder 11. Further, the union nut 3 of the other pipe joint 30 in one side is rotatably installed to an outer periphery in one end side of a second elbow 16 so as to be screwed onto the first elbow 15.

The union nut 3 which is screwed onto the nozzle holder 11 fastens a flange 6 which is provided in the outer periphery in the one end side of the first elbow 15. The other union nut 3 fastens the flange 6 which is provided in the outer periphery in the one end side of the second elbow 16, whereby the first elbow 15 is connected to the nozzle holder 11, and the second elbow 16 is connected to the first elbow 15.

While maintaining the connecting state, the first elbow 15 is rotated at a predetermined angle with respect to the nozzle holder 11, and the second elbow 16 is rotated at a predetermined angle with respect to the first elbow 15.

The rotations of the first elbow 15 and the second elbow 16 in the exemplified spray nozzle unit are carried out for the purpose of opening and closing a valve 14 arranged in an inner portion of the pipe joint 30 and for changing a position and a direction of a nozzle 12 fixed to the second elbow 16. If the opening and closing of the valve and the changing of the position and the direction of the nozzle are carried out in this manner, it is possible to simplify the structure of the valve and the structure of the relative rotation.

However, in the pipe joint 30, since the flange 6 formed in the first elbow 15 and the second elbow 16 is fastened by the union nut 3 and strong friction is generated with respect to the flange 6, the union nut 3 rotates together (corotates) so as to loosen if the first elbow 15 is rotated with respect to the nozzle holder 11 in a loosening direction of the union nut 3. The same applies to the case where the second elbow 16 is rotated with respect to the first elbow 15.

As a method of preventing the loosening, if the union nut is mechanically fixed to a non-rotating member by using a connecting pin as shown in Patent Document 1 mentioned above, fixing and releasing the fixing of the union nut becomes complicated. Further, a small connecting pin may be lost at the time of detachment.

Further, in the method of Patent Document 2, it is necessary to provide a connecting portion where relative rotation is allowed, at a position different from a connecting portion by the union nut, thereby causing complication and enlargement in size of the structure of the connecting portion.

Further, in the loosening preventing structure of Patent Document 3, it is necessary that the gear teeth in the cap side can pass over the gear teeth in the neck side by the force which rotates the cap in the loosening direction, and it is difficult to secure high reliability in the rotation prevention of the union nut which is exposed to a great rotating force. Further, there is a risk that the gear teeth in the cap side and the gear teeth in the neck side wear or collapse by being rubbed against each other, and there is also concern in durability.

An object of the present invention is to reliably carry out corotation prevention of a union nut in a member joint (a pipe joint or a shaft joint) in which a great force for corotating the union nut is inevitably transmitted to the union nut connecting two members at the time of relatively rotating the two members, without complicating fixation and releasing of the fixation of the nut, and without causing enlargement in size and deterioration of durability of the connecting portion.

Means for Solving the Problems

In order to solve the above problems, the present invention provides a member joint comprising a first member provided with a male thread on an outer periphery thereof in a connecting end side, a second member provided with a flange on an outer periphery thereof in the connecting end side, and a union nut rotatably installed on the outer periphery of the second member so as to be in threaded engagement with the male thread, wherein the first member and the second member are connected together by pinching the flange between the union nut and the first member or another member which is retained by the first member, wherein an outer periphery in proximity to a male thread forming portion of the first member is provided with a projection having a leading surface and a trailing surface which are inclined in opposed directions to each other, a lock ring with an inner diameter larger than an outer diameter of the projection forming portion of the first member is rotatably attached to a leading open end portion of the union nut, an inner periphery of the lock ring is provided with an inwardly extending lock pawl which is pressed by the projection when the lock ring is rotated so as to be elastically deformed and pass over the projection, the unit nut has a pinching piece located radially outwardly of the projection and engaged with the lock pawl, and a leading end side of the lock pawl faces the trailing surface at a position where the union nut is fastened to a screwing end point, and a leading end side of the lock pawl is pinched between the pinching piece and the trailing surface when the union nut rotates by itself in a loosening direction from the position.

The member joint described above is preferably structured such that the lock ring is formed by a high strength resin, preferably a polyacetal which is referred to as an engineering plastic. The union nut can be formed by metal or resin.

Further, it is preferable that a plurality of the projections, the lock pawls, and the pinching pieces are provided respectively at fixed pitches in a circumferential direction, the numbers of the lock pawls and the pinching pieces are made larger than the number of the projections, and the pinching pieces are arranged in a loosely fitted state between the lock pawls, and it is preferable that an inclination angle of the trailing surface is made larger than an inclination angle of the leading surface, and the lock pawls are inclined in a direction in parallel to the trailing surface at a position in contact with the trailing surface.

The member joint may be provided as a pipe joint so as to connect a first member and a second member (both of which are constructed by a pipe) by the union nut. Further, the member joint may be provided as a shaft joint so as to connect a first member and a second member (each of which is constructed by a solid or hollow shaft) by the union nut.

The present invention also provides a spray nozzle unit which improves reliability of a connection of a nozzle head with respect to a nozzle holder by using the member joint.

The spray nozzle unit includes a nozzle holder provided with an internal flow path, a nozzle head having a nozzle for injecting a liquid in a leading end, a pipe joint which connects the nozzle head to the nozzle holder, and a valve which is arranged in an inner portion of a connecting portion between the nozzle holder and the nozzle head, and the above-described member joint according to the present invention is employed as the pipe joint. Further, the union nut of the member joint is screwed onto a male thread provided on an outer periphery of an end portion of the nozzle holder, a flange provided in an end portion in a connecting side of the nozzle head is pinched between the union nut and the nozzle holder or a member which is retained by the nozzle holder, a projection having the leading surface and the trailing surface of the member joint is provided in an outer periphery of the nozzle holder so as to come close to the male thread, and a lock pawl which is provided in the lock ring of the member joint is structured such as to be pinched between a pinching piece provided in the union nut and the trailing surface of the projection, when the union nut of the member joint rotates by itself in a loosening direction.

The spray nozzle unit may be structured such that the nozzle head includes a first elbow connected to the nozzle holder, and a second elbow connected to the first elbow, and a connection of the first elbow with respect to the nozzle holder, and a connection of the second elbow with respect to the first elbow are both achieved by using the above-described member joint according to the present invention.

In the structure in which the valve is embedded in each of the connecting portion by the member joint, that is, the connecting portion between the nozzle holder and the first elbow, and the connecting portion between the first elbow and the second elbow, and the opening and closing of the valve and the changing of the position and the direction of the nozzle provided in the second elbow are carried out by the relative rotation between the nozzle holder and the first elbow, and the relative rotation between the first elbow and the second elbow, the problem of loosening caused by the corotation of the union nut can be solved in both of the connecting portion of the first elbow with respect to the nozzle holder, and the connecting portion of the second elbow with respect to the first elbow.

Effects of the Invention

In the member joint according to the present invention, if the union nut is rotated in a fastening direction, the lock pawl is pushed by the pinching piece, the lock ring rotates therewith, and the lock pawl is pushed by the projection (the leading surface) provided in the outer periphery of the first member so as to be elastically deformed and pass over the projection. Accordingly, the fastening of the union nut can be carried out without limitation.

On the other hand, if the union nut is screwed into the fastening end point, the leading end side of the lock pawl faces the trailing surface at that position. Further, if the union nut tries to rotate by itself in the loosening direction from the position, the pinching piece pinches the lock pawl with respect to the trailing surface.

The pinching becomes stronger with enlargement of the force by which the union nut tries to rotate by itself in the loosening direction. Accordingly, the lock ring cannot rotate when the union nut tries to rotate by itself in the loosening direction, and the rotation of the union nut in the loosening direction can be reliably prevented by the lock ring.

Further, if the lock ring is rotated in the loosening direction of the union nut, the pinching force by the pinching piece is not generated. Accordingly, the lock pawl slides on the trailing surface so as to be elastically deformed and pass over the projection. Further, the lock pawl pushes and moves the pinching piece in a rear side in the fastening direction, whereby the union nut rotates together and the union nut can be detached.

As described above, the member joint according to the present invention can prevent the rotation of the union nut in the loosening direction without using a stop pin, and the fixation and the release of the fixation of the nut do not become complicated.

Further, the lock ring may be a small part which is fitted to an outer periphery of a leading end of the union nut, and thus does not cause enlargement in size and complication of the connecting portion by the joint.

Further, since the lock pawl of the lock ring can be elastically deformed, and the lock pawl escapes while elastically deforming so as to pass over the projection, wear and collapse of the lock pawl or the projection are hardly generated, and durability is sufficiently secured.

In the structure in which the union nut and the lock ring are formed by a resin, it is possible to manufacture these elements by a mold forming method which is excellent in productivity.

Further, in the structure in which a plurality of the projections, the lock pawls, and the pinching pieces are provided, the prevention of loosening of the union nut is carried out at a plurality of positions, and reliability for preventing the loosening is improved. In addition, a load of the lock pawl and the pinching piece is dispersed, and the durability is further improved.

Further, in the structure in which the inclination angle of the trailing surface of the projection is made larger than the inclination angle of the leading surface, and the lock pawl is inclined in the direction in parallel to the trailing surface at the position in contact with the trailing surface, pinching stability of the lock pawl by the trailing surface and the pinching piece can be improved while a rotating resistance of the lock ring is kept low.

In addition, in the spray nozzle unit according to the present invention, the loosening of the union nut which connects the nozzle head and the nozzle holder is not generated. Accordingly, with the method of relatively rotating the nozzle head and the nozzle holder, it is possible do simplify the structure of the valve and the relative rotation by carrying out the opening and closing of the valve and the changing of the position and the direction of the nozzle.

EMBODIMENT FOR CARRYING OUT THE INVENTION

An embodiment of a member joint and a spray nozzle unit according to the present invention will be described below with reference to FIGS. 1 to 6 of the accompanying drawings. A basic structure of the member joint according to the present invention is shown in FIGS. 1 to 3(d). An illustrated member joint 10 is constructed as a pipe joint, and has a first member 1, a second member 2, a union nut 3, and a lock ring 4. These members are all produced by mold forming while using a high strength resin (for example, polyacetal) as a material.

Figure 1:
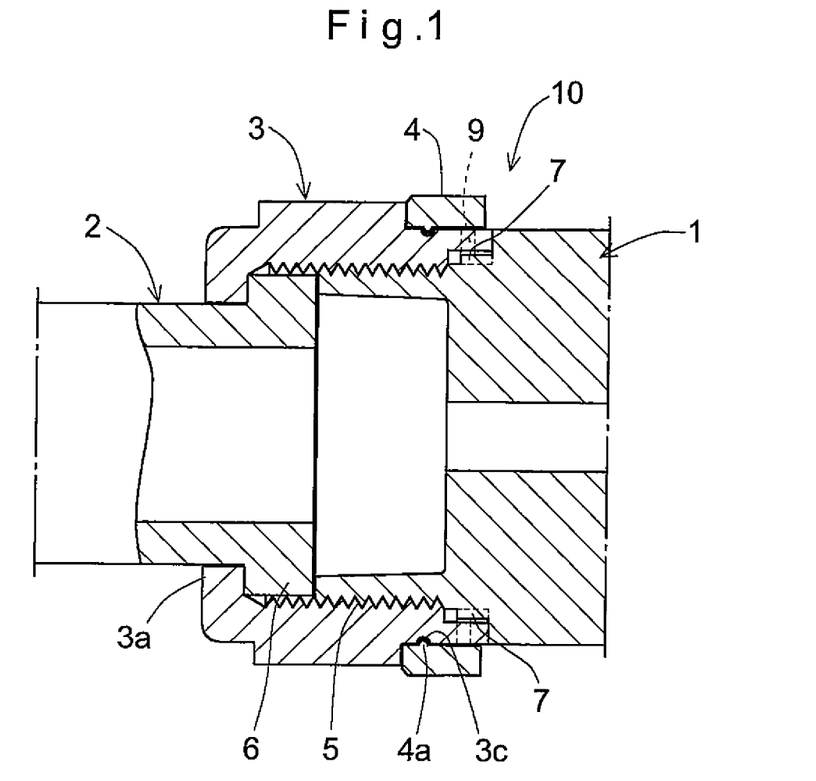
FIG. 1 is a cross sectional view showing an example of a member joint of the present invention.
Figure 2:
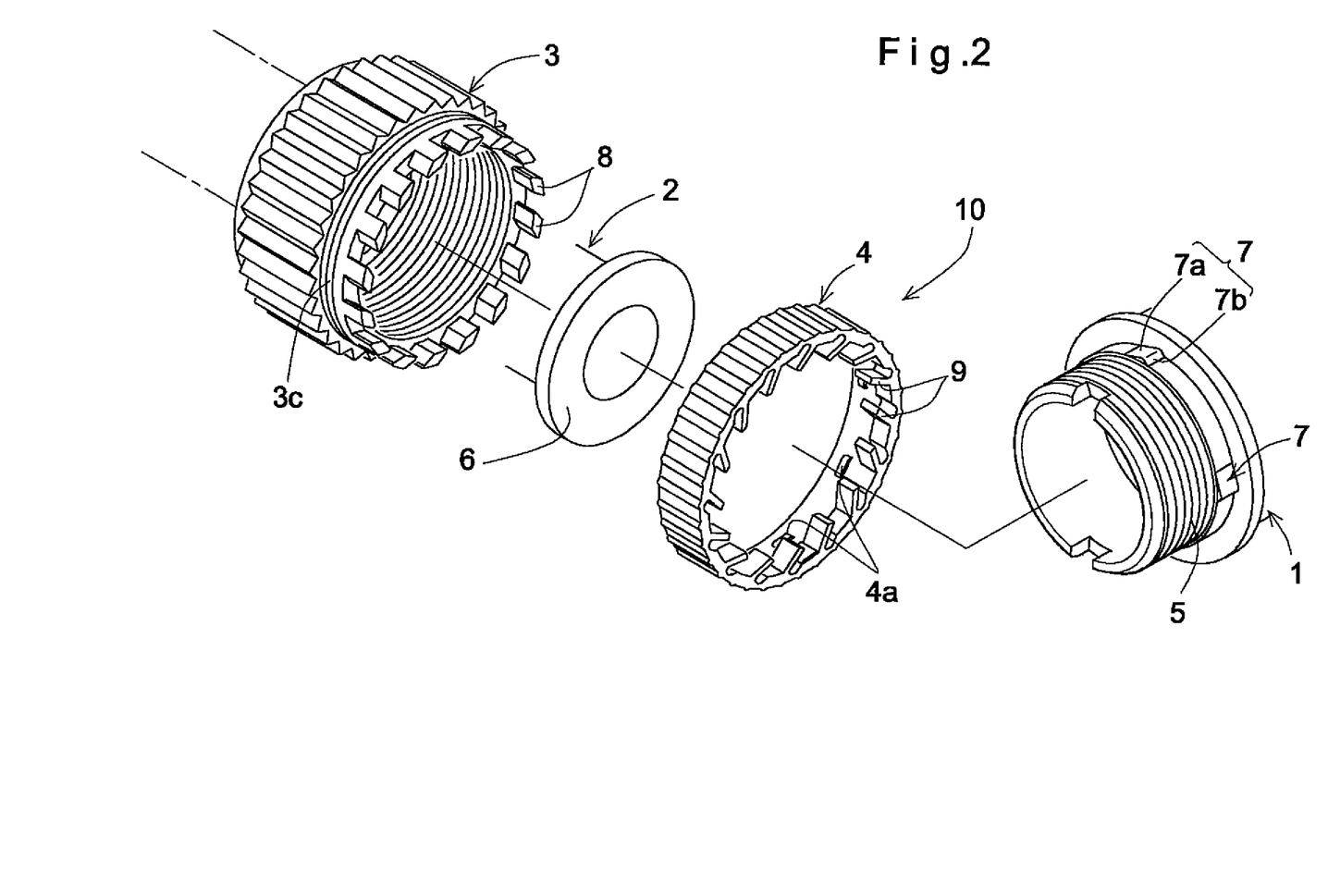
FIG. 2 is an exploded perspective view of the member joint in FIG. 1.

The first member 1 and the second member 2 are pipes to be connected. The first member 1 and the second member 2 are connected by the union nut 3. Slip preventing irregularities are formed as a preferable element on an outer periphery of the union nut 3 and the lock ring 4.

A male thread 5 is provided on an outer periphery in a connecting end side of the first member 1, and the union nut 3 is screwed onto the male thread 5. The union nut 3 is installed to an outer periphery of the second member 2, and pinches a flange 6 which is provided in an outer periphery in a connecting end side of the second member 2, with respect to an opposed position by an end wall 3a.

The illustrated member joint 10 pinches the flange 6 between the end wall 3a of the union nut 3 and the connecting end of the first member 1, however, in the case where another member retained by the first member 1 is provided in the connecting portion, the flange 6 may be pinched between the other member and the end wall 3a.

A plurality of (four in the figure) projections 7 each having a leading surface 7a and a trailing surface 7b which are inclined in opposed directions to each other are provided at fixed distances in a circumferential direction, in an outer periphery in proximity to a male thread forming portion in the connecting end side of the first member 1. The leading surface 7a of the projection 7 has a small inclination angle (a rising angle from the outer peripheral surface of the first member), and the trailing surface 7b has an inclination angle larger than the inclination angle of the leading surface 7a (in the illustrated member joint 10, the inclination angle of the leading surface 7a is about 20 degrees, and the inclination angle of the trailing surface 7b is about 45 degrees).

Figure 3:
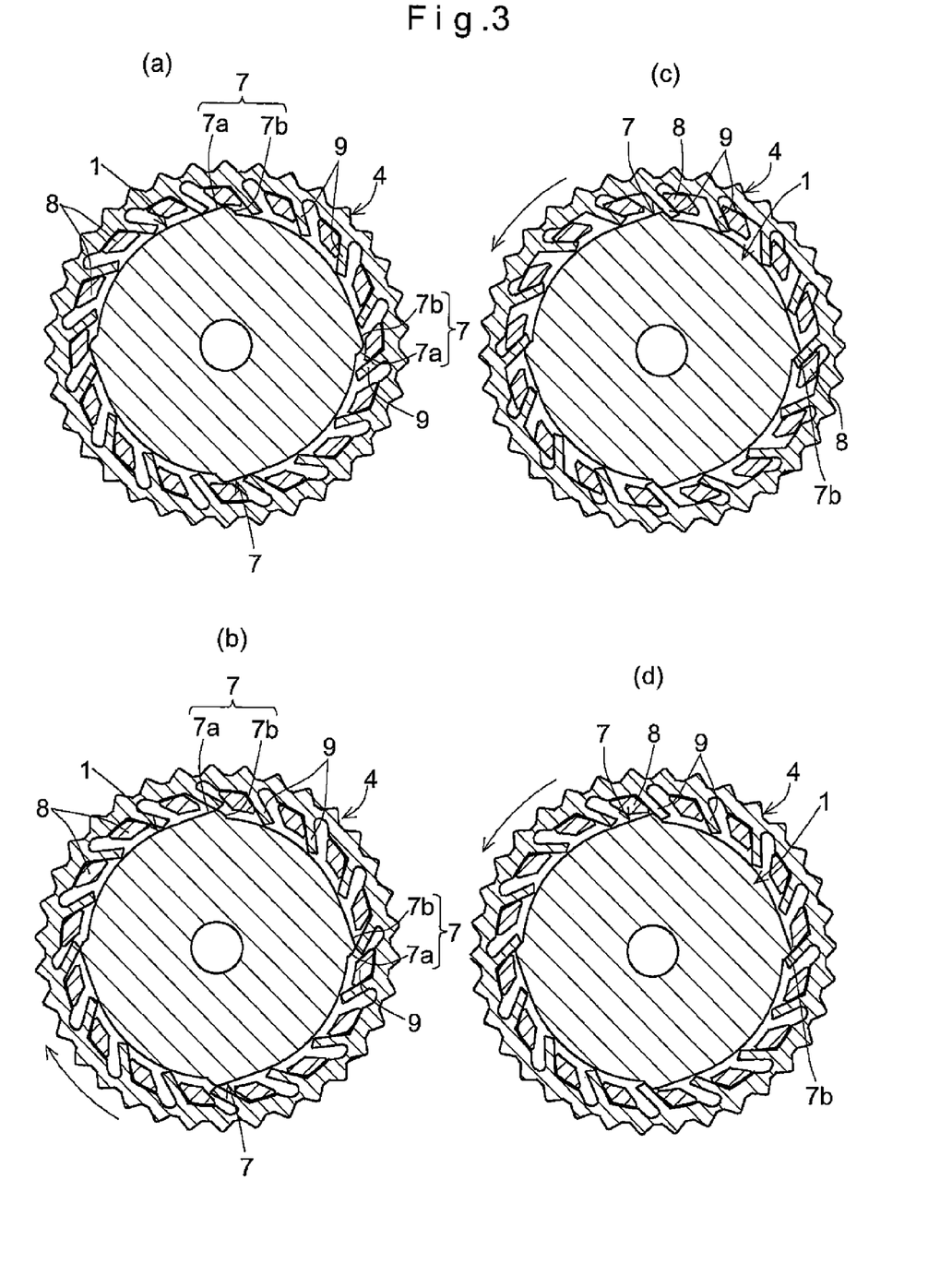
FIGS. 3(a) and 3(b) are explanatory views of an operation in fastening a union nut.
FIG. 3(c) is an explanatory view of an operation of preventing loosening of the union nut.
FIG. 3(d) is an explanatory view of an operation of releasing the loosening prevention of the union nut.

The union nut 3 has pinching pieces 8 which protrude in an axial direction in its leading end (a side opposite to a side where the end wall 3a exists). The pinching pieces 8 are provided at fixed pitches in the circumferential direction in the same number as lock pawls 9 of a lock ring mentioned below, and each of the pinching pieces 8 is arranged between the lock pawls 9 in a loosely fitted state, as shown in FIG. 3.

The lock ring 4 is structured such that an inner diameter of a portion without the lock pawl is larger than an outer diameter of the forming portion of the projection 7 in the first member 1, and the lock ring 4 is rotatably attached to an outer periphery of an open leading end small diameter portion 3b of the union nut 3. The lock ring 4 is connected to the union nut 3 in a state in which a micro convex portion 4a provided in an inner peripheral surface is entered into an annular groove 3c provided in an outer periphery of the leading end small diameter portion 3b of the union nut 3.

An inner periphery of the lock ring 4 is provided with a plurality of lock pawls 9 extending inward at the fixed pitches in the circumferential direction. The lock pawl 9 can be elastically deformed, and is inclined in a preferable direction, that is, in a direction in parallel to the trailing surface 7b at a position in contact with the trailing surface 7b of the projection 7 (refer to FIGS. 3(c) and 3(d)).

Leading ends (free ends) of the lock pawls 9 are aligned on a circle having approximately the same diameter as an outer diameter of a portion having no projection in the projection forming portion of the first member 1. Accordingly, the lock pawls 9 come into slidable contact with the projection 7 when passing through the position of the projection 7.

The lock ring 4 receives the pinching piece 8 by the lock pawls 9 when the union nut 3 tries to rotate by itself in the loosening direction, so as to prevent the rotation. This object can be achieved by the structure in which the installed number of the lock pawl 9 is one, however, if a plurality of lock pawls 9 are provided at small pitches as shown in the figure, the loosening prevention of the union nut 3 can be achieved at a plurality of positions, and reliability of the loosening prevention is improved.

Moreover, the load of the lock pawls 9 and the pinching pieces 8 is dispersed, and durability of the joint is improved. Further, as the numbers of the lock pawls 9 and the pinching pieces 8 increase, the leading end side of the lock pawl 9 faces the trailing surface 7b at a close position when the union nut 3 is fastened into the screwing end point, and thus, positional accuracy at the union nut screwing end point of the projection 7, the pinching piece 8, and the lock pawl 9 can be made rough.

In the member joint 10 structured as described above, if the union nut 3 having the pinching pieces 8 is screwed onto the male thread (reference numeral 5 in FIGS. 1 and 2) of the first member 1 so as to be rotated in the fastening direction (an arrowed clockwise direction) as shown in FIG. 3(a), the lock pawls 9 are pushed by the pinching pieces 8 and the lock ring 4 rotates therewith. At this time, the lock pawls 9 is pushed by the projection 7 so as to be elastically deformed and escape to an outer diameter side, and slidably moves on the leading surface 7a so as to pass over the projection 7.

Accordingly, the leading end of the lock pawl 9 moves to a position facing the trailing surface 7b of the projection 7 at the fastening end point of the union nut 3. Thereafter, if the union nut 3 tries to rotate by itself in the loosening direction, the leading end side of the lock pawl 9 is pinched between the pinching piece 8 and the trailing surface 7b of the projection 7, as shown in FIG. 3(c). Therefore, the lock ring 4 cannot rotate, and the lock pawl 9 serves as a stopper for receiving the pinching piece 8 and the rotation of the union nut 3 in the loosening direction is prevented.

The pinching of the lock pawl 9 by the pinching piece 8 and the trailing surface 7b becomes stronger with enlargement of the force by which the union nut 3 tries to rotate by itself in the loosening direction. Accordingly, even if a strong rotating force is transmitted to the union nut 3 from the second member 2 by the relative rotation of the first member 1 and the second member 2, the union nut 3 is stably retained at the fastening end point. To be specific, the rotation in the loosening direction is generated until the gap between the pinching piece 8 and the lock pawl 9 is absorbed, however, since it is a negligible amount, it is not considered as loosening.

When detaching the fastened union nut 3, the lock ring 4 is rotated in the loosening direction of the union nut 3, as shown in FIG. 3(d). At this time, since the rotating force in the loosening direction is not applied to the union nut 3, the pinching of the lock pawl 9 by the pinching piece 8 is not carried out.

Therefore, the lock pawl 9 can slidably move on the trailing surface 7b while elastically deforming so as to pass over the projection 7, and by subsequently rotating the lock ring 4 in the loosening direction while making the union nut 3 follow, it is possible to release the threaded engagement to the male thread 5 so as to detach the union nut 3 from the first member 1.

Figure 4:
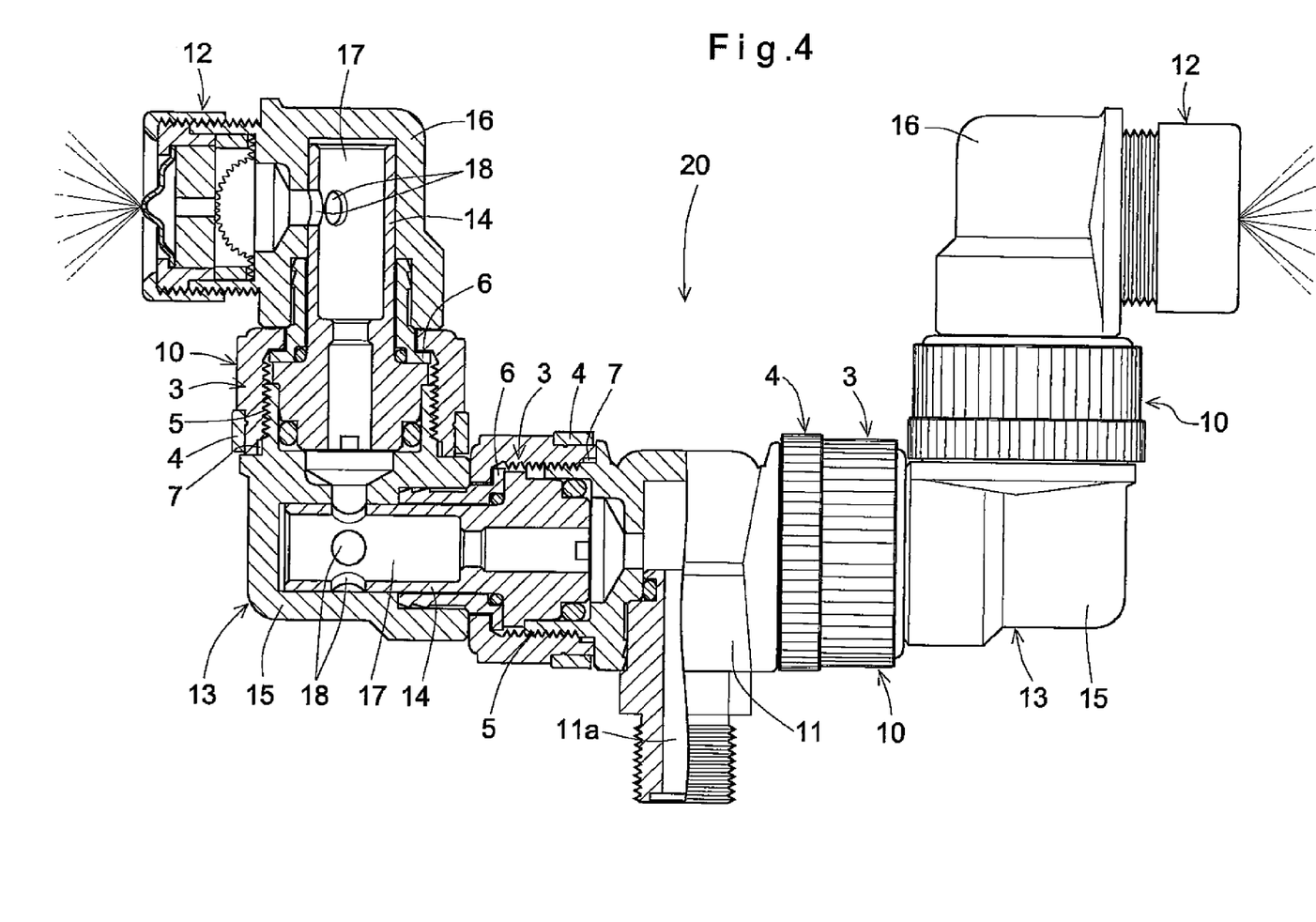
FIG. 4 is a partial breakaway front view showing an example of a spray nozzle unit of the present invention.
Figure 5:
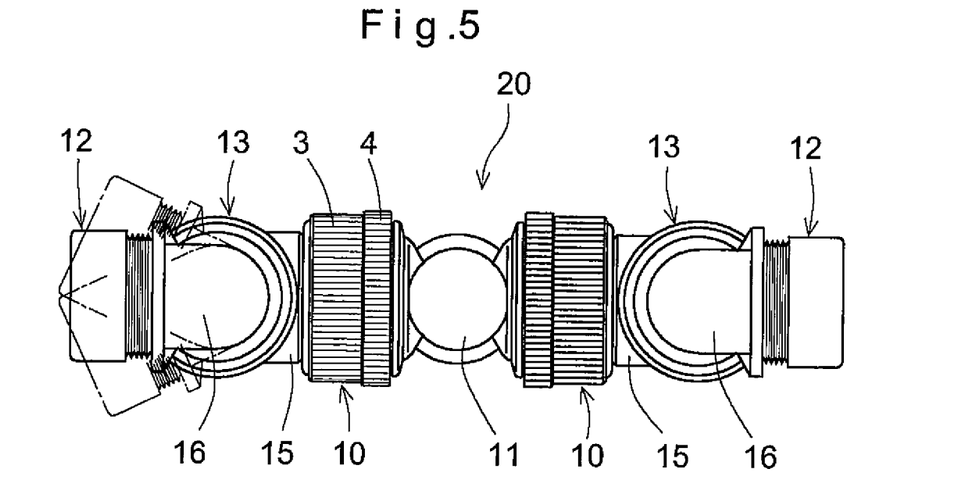
FIG. 5 is a plan view of the spray nozzle unit in FIG. 4.
Figure 6:
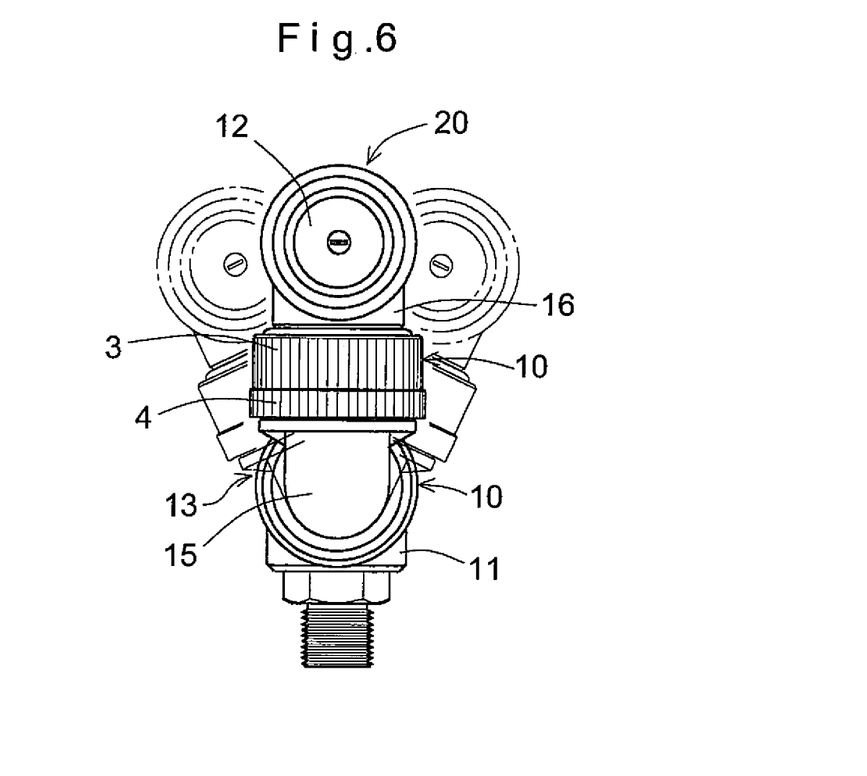
FIG. 6 is a side view of the spray nozzle unit in FIG. 4.

Next, an example of the spray nozzle unit according to the present invention is shown in FIGS. 4 to 6. A spray nozzle unit 20 has a nozzle holder 11 provided with an internal flow path 11a, a nozzle head 13 having a nozzle for injecting a liquid in a leading end, a member joint 10 which connects the nozzle head 13 to the nozzle holder 11, and a valve 14. The valve 14 is formed by a polyamide resin (trade name: nylon), a male nipple (which is considered to be a part of a first elbow and a second elbow described below) having a flange 6 is formed by metal such as brass or the like, and the parts other than these two elements and an O-ring for sealing an outer periphery of the valve are all made of a polyacetal molded product.

The nozzle head 13 has been shown as one having a first elbow 15 connected to the nozzle holder 11, and a second elbow 16 connected to the first elbow by using the member joint 10, where the nozzle 12 is attached to one end of the second elbow 16.

The member joints 10 employed in the connecting portions at two positions are both constructed by a pipe joint, and are constructed by the above-described joint according to the present invention.

The valve 14 is provided as one which is embedded in the connecting portion between the nozzle holder 11 and the first elbow 15, and one which is embedded in the connecting portion between the first elbow 15 and the second elbow 16.

The nozzle holder 11 is connected to a liquid supply path (not illustrated). An outer periphery of an end portion of the nozzle holder 11 is provided with a male thread 5 and the above-described projection 7 positioned near a root of the male thread 5, and the union nut 3 of the member joint 10 is screwed onto the male thread 5.

The union nut 3 screwed onto the male thread 5 of the nozzle holder 11 is rotatably installed to an outer periphery (an outer periphery of a collared sleeve which is independently processed so as to be press fitted) in a connecting end side of the first elbow 15. The union nut 3 pinches the flange 6 provided in an outer periphery of the end portion (the pipe end) of the first elbow 15 with respect to a flange in an outer periphery of the valve 14 which is opposed to the end wall 3a, whereby the first elbow 15 is connected to the nozzle holder 11.

The male thread 5 and the projection 7 are provided also in the outer periphery of the end portion of the first elbow 15, the union nut 3 is rotatably installed to the outer periphery in the connecting end side of the second elbow 16 in the same manner as described above, and the union nut 3 is screwed onto the male thread 5 of the first elbow 15. Accordingly, the flange 6 provided in the outer periphery of the end portion of the second elbow 16 is pinched between the end wall 3a of the union nut 3 and the flange in the outer periphery of the valve 14 which is opposed thereto, and the second elbow 16 is connected to the first elbow 15.

As described above, by connecting the first elbow 15 to the nozzle holder 11, and connecting the second elbow 16 to the first elbow 15 by using the member joint 10 according to the present invention, it is possible to carry out the relative rotation between the first elbow 15 and the nozzle holder 11, and the relative rotation between the second elbow 16 and the first elbow 15, without generating loosening of the union nut 3.

With regard to the illustrated spray nozzle unit 20, the relative rotation is carried out for opening and closing the valve 14 and changing the position and the direction of the nozzle 12.

In the valve 14, a plurality of connecting ports 18, which communicate the internal passage 17 with passage outlets of the first elbow 15 and the second elbow 16, are provided with their positions shifted in a circumferential direction. The connecting ports 18 at the different positions communicate the internal passage 17 with the passage outlets of the first and second elbows 15 and 16, by the relative rotation of the first elbow 15 and the nozzle holder 11, or the relative rotation of the second elbow 16 and the first elbow 15, and the connecting position and the connecting state are changed.

Accordingly, the position and the direction of the nozzle 12 are changed. Further, it is possible to close the valve 14 so as to stop the spraying by moving the passage outlets of the first and second elbows 15 and 16 to a position where the connecting port 18 is not provided.

The exemplified spray nozzle unit 20 is provided with two sets of nozzles 12, first elbows 15, and second elbows 16, and they are arranged center symmetrically, however, the spray nozzle unit according to the present invention may be provided with one set of nozzles 12, first elbows 15, and second elbows 16, or may be structured such that the nozzle 12 is attached to the first elbow 15 while omitting the second elbow 16.

Further, the member joint 10 according to the present invention can be utilized when connecting two shafts so as to be relatively rotatable. For example, if an arm is constructed by bending one shaft, and at the time of installing equipment and materials such as lighting equipment, a mirror, a camera, or the like to a leading end of the arm, the bent arm is made relatively rotatable with respect to another shaft serving as a holder, it is possible to change the position and the direction of the equipment and materials in the leading end of the arm.

Even in the intended use as described above, the loosening of the union nut is generated by relatively rotating the shaft which is connected by using the shaft joint including the union nut, however, it is possible to eliminate the loosening by using the member joint according to the present invention.

DESCRIPTION OF REFERENCE SIGNS

1 first member
2 second member
3 union nut
3*a* end wall
3*b* leading end small diameter portion
3*c* annular groove
4 lock ring
4*a* micro convex portion
5 male thread
6 flange
7 projection
7*a* leading surface
8 pinching piece
9 lock pawl
10 member joint
11 nozzle holder
11*a* internal flow path
12 nozzle
13 nozzle head
14 valve
15 first elbow
16 second elbow
17 internal passage
18 connecting port
20 spray nozzle unit

The invention claimed is:

1. A member joint comprising:
a first member (1) provided with a male thread (5) on an outer periphery thereof in a connecting end side;
a second member (2) provided with a flange (6) on an outer periphery thereof in the connecting end side; and
a union nut (3) rotatably installed on the outer periphery of the second member (2) so as to be in threaded engagement with the male thread (5),
wherein the first member (1) and the second member (2) are connected together by pinching the flange (6) between the union nut (3) and the first member (1) or another member which is retained by the first member,
wherein an outer periphery in proximity to a male thread forming portion of the first member (1) is provided with a projection (7) having a leading surface (7*a*) and a trailing surface (7*b*) which are inclined in opposed directions to each other,
a lock ring (4) with an inner diameter larger than an outer diameter of the projection forming portion of the first member (1) is rotatably attached to a leading open end portion of the union nut (3),
an inner periphery of the lock ring (4) is provided with an inwardly extending lock pawl (9) which is pressed by the projection (7) when the lock ring is rotated so as to be elastically deformed and pass over the projection (7),
the union nut (3) has a pinching piece (8) located radially outwardly of the projection (7) and engaged with the lock pawl (9), and
a leading end side of the lock pawl (9) faces the trailing surface (7*b*) at a position where the union nut (3) is fastened to a screwing end point, and a leading end side of the lock pawl (9) is pinched between the pinching piece (8) and the trailing surface (7*b*) when the union nut (3) rotates by itself in a loosening direction from the position.

2. The member joint according to claim 1, wherein the lock ring (4) is formed by a high strength resin.

3. The member joint according to claim 2, wherein
a plurality of the projections (7), the lock pawls (9), and the pinching pieces (8) are provided respectively at fixed pitches in a circumferential direction,
the numbers of the lock pawls (9) and the pinching pieces (8) are made larger than the number of the projections (7), and
the pinching pieces (8) are arranged in a loosely fitted state between the lock pawls (9).

4. The member joint according to claim 2, wherein
an inclination angle of the trailing surface (7*b*) is made larger than an inclination angle of the leading surface (7*a*), and
the lock pawls (9) are inclined in a direction in parallel to the trailing surface (7*b*) at a position in contact with the trailing surface (7*b*).

5. The member joint according to claim 1, wherein
a plurality of the projections (7), the lock pawls (9), and the pinching pieces (8) are provided respectively at fixed pitches in a circumferential direction,
the numbers of the lock pawls (9) and the pinching pieces (8) are made larger than the number of the projections (7), and
the pinching pieces (8) are arranged in a loosely fitted state between the lock pawls (9).

6. The member joint according to claim 5, wherein
an inclination angle of the trailing surface (7*b*) is made larger than an inclination angle of the leading surface (7*a*), and
the lock pawls (9) are inclined in a direction in parallel to the trailing surface (7*b*) at a position in contact with the trailing surface (7*b*).

7. The member joint according to claim 1, wherein
an inclination angle of the trailing surface (7*b*) is made larger than an inclination angle of the leading surface (7*a*), and
the lock pawls (9) are inclined in a direction in parallel to the trailing surface (7*b*) at a position in contact with the trailing surface (7*b*).

8. A spray nozzle unit comprising:
a nozzle holder (11) provided with an internal flow path;
a nozzle head (13) having a nozzle (12) for injecting a liquid at a leading end thereof;
the member joint (10) according to claim 1, which connects the nozzle head (13) to the nozzle holder (11); and
a valve (14) which is arranged in an inner portion of a connecting portion between the nozzle holder (11) and the nozzle head (13),
wherein the union nut (3) of the member joint (10) is screwed onto a male thread (5) provided on an outer periphery of an end portion of the nozzle holder (11), wherein the flange (6) is provided in an end portion in a connecting side of the nozzle head (13), and wherein the projection (7) having the leading surface (7a) and the trailing surface (7b) of the member joint (10) is provided in an outer periphery of the nozzle holder (11) so as to come close to the male thread (5).

9. The spray nozzle unit according to claim 8, wherein the nozzle head (13) includes a first elbow (15) connected to the nozzle holder (11) and a second elbow (16) connected to the first elbow (15), a connection of the first elbow (15) with respect to the nozzle holder (11), and a connection of the second elbow (16) with respect to the first elbow (15) are both achieved by using the member joint (10), the valve (14) is embedded in each of the connecting portion between the nozzle holder (11) and the first elbow (15), and the connecting portion between the first elbow (15) and the second elbow (16), and opening and closing of the valve (14) and changing of a position and a direction of the nozzle (12) provided in the second elbow (16) are carried out by relative rotation between the nozzle holder (11) and the first elbow (15), and relative rotation between the first elbow (15) and the second elbow (16).

10. A spray nozzle unit comprising:
a nozzle holder (11) provided with an internal flow path;
a nozzle head (13) having a nozzle (12) for injecting a liquid at a leading end thereof;
the member joint (10) according to claim 2, which connects the nozzle head (13) to the nozzle holder (11); and
a valve (14) which is arranged in an inner portion of a connecting portion between the nozzle holder (11) and the nozzle head (13), wherein the union nut (3) of the member joint (10) is screwed onto a male thread (5) provided on an outer periphery of an end portion of the nozzle holder (11), and wherein the flange (6) is provided in an end portion in a connecting side of the nozzle head (13), and wherein the projection (7) having the leading surface (7a) and the trailing surface (7b) of the member joint (10) is provided in an outer periphery of the nozzle holder (11) so as to come close to the male thread (5).

11. The spray nozzle unit according to claim 10, wherein the nozzle head (13) includes a first elbow (15) connected to the nozzle holder (11) and a second elbow (16) connected to the first elbow (15), a connection of the first elbow (15) with respect to the nozzle holder (11), and a connection of the second elbow (16) with respect to the first elbow (15) are both achieved by using the member joint (10), the valve (14) is embedded in each of the connecting portion between the nozzle holder (11) and the first elbow (15), and the connecting portion between the first elbow (15) and the second elbow (16), and opening and closing of the valve (14) and changing of a position and a direction of the nozzle (12) provided in the second elbow (16) are carried out by relative rotation between the nozzle holder (11) and the first elbow (15), and relative rotation between the first elbow (15) and the second elbow (16).

12. A spray nozzle unit comprising:
a nozzle holder (11) provided with an internal flow path;
a nozzle head (13) having a nozzle (12) for injecting a liquid at a leading end thereof;
the member joint (10) according to claim 5, which connects the nozzle head (13) to the nozzle holder (11); and a valve (14) which is arranged in an inner portion of a connecting portion between the nozzle holder (11) and the nozzle head (13), wherein the union nut (3) of the member joint (10) is screwed onto a male thread (5) provided on an outer periphery of an end portion of the nozzle holder (11), wherein the flange (6) is provided in an end portion in a connecting side of the nozzle head (13), and wherein the projection (7) having the leading surface (7a) and the trailing surface (7b) of the member joint (10) is provided in an outer periphery of the nozzle holder (11) so as to come close to the male thread (5).

13. The spray nozzle unit according to claim 12, wherein the nozzle head (13) includes a first elbow (15) connected to the nozzle holder (11) and a second elbow (16) connected to the first elbow (15), a connection of the first elbow (15) with respect to the nozzle holder (11), and a connection of the second elbow (16) with respect to the first elbow (15) are both achieved by using the member joint (10), the valve (14) is embedded in each of the connecting portion between the nozzle holder (11) and the first elbow (15), and the connecting portion between the first elbow (15) and the second elbow (16), and opening and closing of the valve (14) and changing of a position and a direction of the nozzle (12) provided in the second elbow (16) are carried out by relative rotation between the nozzle holder (11) and the first elbow (15), and relative rotation between the first elbow (15) and the second elbow (16).

14. A spray nozzle unit comprising:
a nozzle holder (11) provided with an internal flow path;
a nozzle head (13) having a nozzle (12) for injecting a liquid at a leading end thereof;
the member joint (10) according to claim 7, which connects the nozzle head (13) to the nozzle holder (11); and
a valve (14) which is arranged in an inner portion of a connecting portion between the nozzle holder (11) and the nozzle head (13), wherein the union nut (3) of the member joint (10) is screwed onto a male thread (5) provided on an outer periphery of an end portion of the nozzle holder (11), wherein the flange (6) is provided in an end portion in a connecting side of the nozzle head (13), and wherein the projection (7) having the leading surface (7a) and the trailing surface (7b) of the member joint (10) is provided in an outer periphery of the nozzle holder (11) so as to come close to the male thread (5).

15. The spray nozzle unit according to claim 14, wherein the nozzle head (13) includes a first elbow (15) connected to the nozzle holder (11) and a second elbow (16) connected to the first elbow (15), a connection of the first elbow (15) with respect to the nozzle holder (11), and a connection of the second elbow (16) with respect to the first elbow (15) are both achieved by using the member joint (10), the valve (14) is embedded in each of the connecting portion between the nozzle holder (11) and the first elbow (15), and the connecting portion between the first elbow (15) and the second elbow (16), and opening and closing of the valve (14) and changing of a position and a direction of the nozzle (12) provided in the second elbow (16) are carried out by relative rotation between the nozzle holder (11) and the first elbow (15), and relative rotation between the first elbow (15) and the second elbow (16).

* * * * *